(12) United States Patent
Tu (10) Patent No.: US 10,289,136 B1
(45) Date of Patent: May 14, 2019

(54) CONVERTING APPARATUS AND METHOD THEREOF

(71) Applicant: Alpha and Omega Semiconductor (Cayman) Ltd., Sunnyvale, CA (US)

(72) Inventor: Wei-Cheng Tu, Hukou Township (TW)

(73) Assignee: ALPHA AND OMEGA SEMICONDUCTORE (CAYMAN) LTD., Sunnyvale, CA (US)

( * ) Notice: Subject to any disclaimer, the term of this patent is extended or adjusted under 35 U.S.C. 154(b) by 0 days.

(21) Appl. No.: 15/879,887

(22) Filed: Jan. 25, 2018

(51) Int. Cl.
*G05F 1/445* (2006.01)
*H02M 1/00* (2006.01)
*H02M 3/156* (2006.01)
*H02M 3/158* (2006.01)
*H02M 1/12* (2006.01)

(52) U.S. Cl.
CPC ............ *G05F 1/445* (2013.01); *H02M 1/126* (2013.01); *H02M 3/156* (2013.01); *H02M 3/158* (2013.01); *H02M 2001/0006* (2013.01); *H02M 2001/0009* (2013.01); *H02M 2001/0025* (2013.01)

(58) Field of Classification Search
CPC .... H02M 3/156; H02M 3/158; H02M 3/1588; H02M 3/1582; H02M 2003/1566; H02M 2001/0025; H02M 2001/0009; H02M 2001/0058; H02M 2001/0003; H02M 1/4208; H02M 1/4225; H02M 1/126; H02M 2001/0006; G05F 1/445
See application file for complete search history.

(56) References Cited

U.S. PATENT DOCUMENTS

| 9,081,403 | B1* | 7/2015 | Leone | G05F 1/468 |
| 2009/0273330 | A1* | 11/2009 | Sisson | G05F 1/70 |
| | | | | 323/288 |
| 2011/0031948 | A1* | 2/2011 | Chien | H02M 3/1588 |
| | | | | 323/282 |
| 2011/0316508 | A1* | 12/2011 | Cheng | H02M 1/14 |
| | | | | 323/282 |
| 2012/0049824 | A1* | 3/2012 | Chen | H02M 3/156 |
| | | | | 323/283 |
| 2012/0153921 | A1* | 6/2012 | Brokaw | H02M 3/156 |
| | | | | 323/288 |
| 2013/0328534 | A1* | 12/2013 | Hsieh | G05F 3/02 |
| | | | | 323/271 |
| 2014/0354250 | A1* | 12/2014 | Deng | H02M 3/1582 |
| | | | | 323/271 |

(Continued)

*Primary Examiner* — Gustavo A Rosario-Benitez
(74) *Attorney, Agent, or Firm* — Chen-Chi Lin (57) ABSTRACT

A converting apparatus includes: a driving device arranged to charge a connecting terminal by a charging signal and to discharge the connecting terminal by a discharging signal for generating a driving signal; a filtering device coupled to the connecting terminal for generating an output voltage according to the driving signal; and a controlling device coupled to the connecting terminal, for receiving the driving signal to generate a control signal. The driving device is arranged to generate the charging signal and the discharging signal according to the control signal. A method of generating an output voltage includes the steps of generating a driving signal; filtering the driving signal to generate the output voltage; receiving the driving signal to generate a control signal; and generating the charging signal and the discharging signal according to the control signal.

18 Claims, 10 Drawing Sheets

(56) References Cited

U.S. PATENT DOCUMENTS

| | | | |
|---|---|---|---|
| 2017/0182894 A1* | 6/2017 | Yamaguchi | H02M 3/1582 |
| 2017/0201086 A1* | 7/2017 | Chen | H02H 3/08 |
| 2017/0201175 A1* | 7/2017 | Chen | H02M 1/08 |
| 2018/0062509 A1* | 3/2018 | Duong | H02M 1/08 |
| 2018/0358898 A1* | 12/2018 | Yamaguchi | H02M 3/1582 |

* cited by examiner

CONVERTING APPARATUS AND METHOD THEREOF

FIELD OF THE INVENTION

This invention relates generally to a converting apparatus. More particularly, the present invention relates to a converting apparatus including a driving device, a filtering device and a controlling device and a method of generating an output voltage.

BACKGROUND OF THE INVENTION

Converter systems and inverter systems are used throughout electric utility power systems to transfer from and to a utility system grid, respectively. Constant on-time (COT) converter is a converter generally applied in wide-input-voltage-range systems. Generally, COT topology has bad noise immunity and sub-harmonic issue but good transient performance. In addition, the stability of COT topology suffers from limitations on the effective series resistance (ESR) of output capacitors. As a result, an output capacitor with a relatively small ESR may not be suitable for use in a COT converter. Conventionally, there are different ways to improve noise immunity and stability. One of the conventional ways uses inductor current as a compensated ramp for injection to a feedback loop. However, this conventional way needs an extra sample and hold circuit and may increase the complexity of the COT converter.

SUMMARY OF THE INVENTION

A converting apparatus includes a driving device, a filtering device and a controlling device. The driving device is arranged to charge a connecting terminal by a charging signal and to discharge the connecting terminal by a discharging signal for generating a driving signal. The filtering device is coupled to the connecting terminal for generating an output voltage according to the driving signal. The controlling device is coupled to the connecting terminal, for receiving the driving signal to generate a control signal. The driving device is arranged to generate the charging signal and the discharging signal according to the control signal. A method of generating an output voltage includes the steps of generating a driving signal; filtering the driving signal to generate the output voltage; receiving the driving signal to generate a control signal; and generating the charging signal and the discharging signal according to the control signal.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Further, spatially relative terms, such as "beneath," "below," "lower," "above," "upper", "lower", "left", "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It will be understood that when an element is referred to as being "connected to" or "coupled to" another element, it may be directly connected to or coupled to the other element, or intervening elements may be present.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Figure 1:
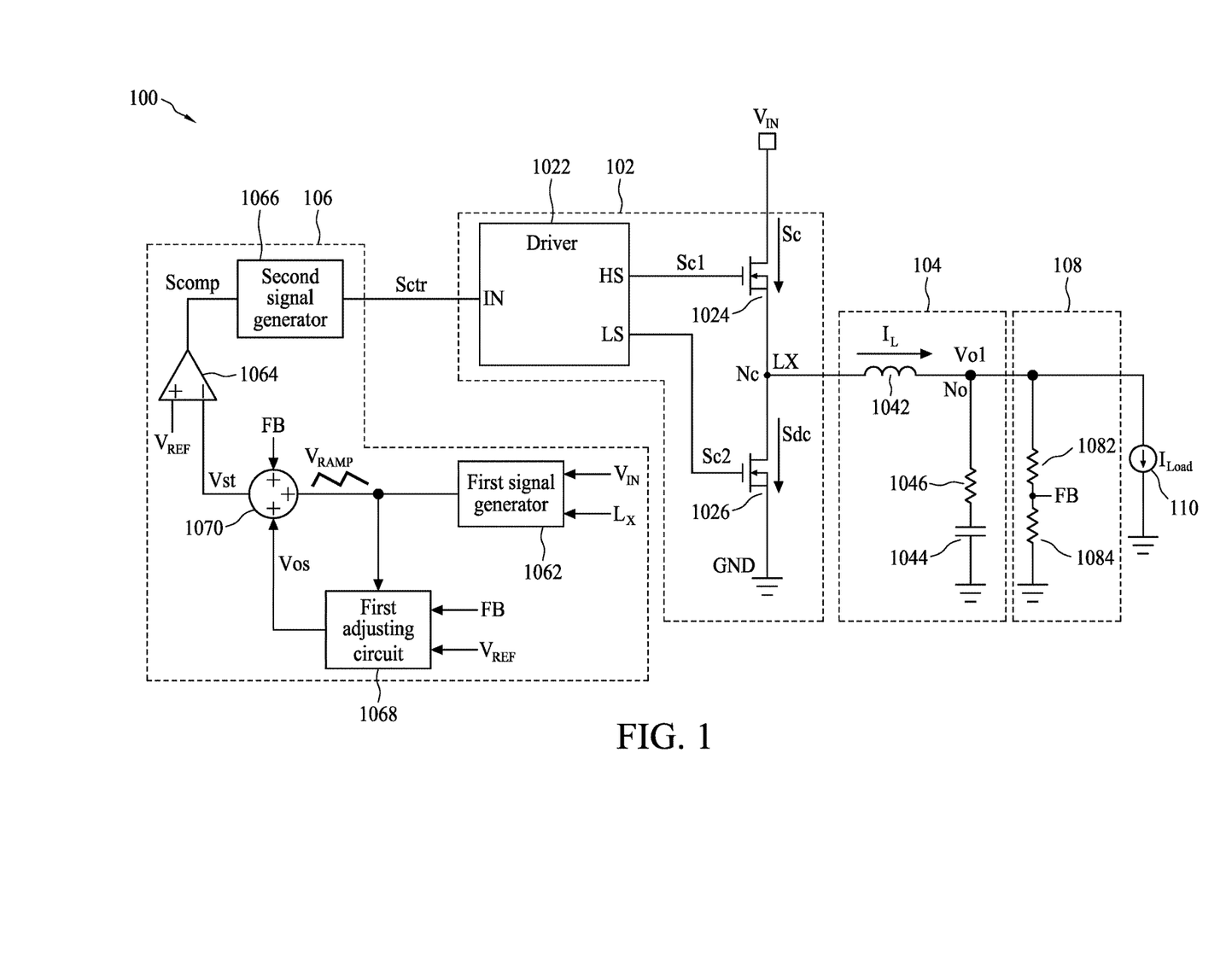
FIG. 1 is a diagram illustrating a converting apparatus in accordance with some embodiments.

FIG. 1 is a diagram illustrating a converting apparatus 100 in accordance with some embodiments. The converting apparatus 100 includes a constant on-time (COT) converter arranged to generate a supply power for a circuit system. Referring to FIG. 1, the converting apparatus 100 comprises a driving device 102, a filtering device 104, a controlling device 106, and a dividing circuit 108. The driving device 102 is arranged to charge a connecting terminal $N_c$ in response to a charging signal Se and to discharge the connecting terminal $N_c$ in response to a discharging signal $S_{dc}$ for generating a driving signal $L_x$. The filtering device 104 is coupled to the connecting terminal $N_c$ for generating an output voltage $V_{o1}$ according to the driving signal $L_x$. The filtering device 104 may be a low-pass filtering device. The controlling device 106 is coupled to the connecting terminal $N_c$ for receiving the driving signal $L_x$ in order to generate a control signal $S_{ctr}$. The driving device 102 is arranged to generate the charging signal $S_c$ and the discharging signal Sac according to the control signal $S_{ctr}$.

The dividing circuit 108 is coupled to the filtering device 104 for generating a feedback voltage FB according to the output voltage $V_{o1}$. The dividing circuit 108 comprises a first resistor 1082 and a second resistor 1084. The first resistor 1082 and the second resistor 1084 are serially connected between an output terminal No and a ground voltage GND. The feedback voltage FB is outputted at a node between the first resistor 1082 and the second resistor 1084. During the operation of the converting apparatus 100, a loading device 110 with a current $I_{Load}$ may be coupled to the output terminal $N_o$.

According to some embodiments, the driving device 102 comprises a driver 1022, a first transistor 1024, and a second transistor 1026. The first transistor 1024 may be a high-side field effect transistor (FET). The second transistor 1026 may be a low-side FET. According to some embodiments, the first transistor 1024 and the second transistor 1026 are N-channel metal-oxide-semiconductor field effect transistors (MOSFETs). The driver 1022 is arranged to generate a first control signal $S_{c1}$ and a second control signal $S_{c2}$ according to the control signal $S_{ctr}$. The driver 1022 may be a buck converter. A source of the first transistor 1024 is coupled to the connecting terminal $N_c$ for generating the charging signal $S_c$ according to the first control signal $S_{c1}$. A drain of the first transistor 1024 is coupled to the input voltage $Y_{IN}$. A drain of the second transistor 1026 is coupled to the connecting terminal $N_c$ for generating the discharging signal $S_{dc}$ according to the second control signal $S_{c2}$. A source of the second transistor 1026 is coupled to the ground voltage GND.

According to some embodiments, the controlling device 106 comprises a first signal generator 1062, a comparator 1064, a second signal generator 1066, a first adjusting circuit 1068, and a second adjusting circuit 1070. The first signal generator 1062 is arranged to generate a first triangle signal $V_{RAMP}$ according to the input voltage $Y_{IN}$ and the driving signal $L_x$. The first signal generator 1062 may be a ramp signal generator. The first adjusting circuit 1068 is coupled to the first signal generator 1062 and the dividing circuit 108 for generating an offset voltage $V_{os}$ according to the feedback voltage FB, the first triangle signal $V_{RAMP}$, and the first reference voltage $V_{REF}$. The first adjusting circuit 1068 may be an offset cancelling circuit. The second adjusting circuit 1070 is coupled to the first signal generator 1062 and the first adjusting circuit 1068 for generating a second triangle signal $V_{st}$ according to the feedback voltage FB, the first triangle signal $V_{RAMP}$, and the offset voltage $V_{os}$. The second adjusting circuit 1070 may be an adding circuit. The comparator 1064 is coupled to the second adjusting circuit 1070 for outputting a comparing signal $S_{comp}$ according to the second triangle signal $V_{st}$ and a first reference voltage $V_{REF}$. The second signal generator 1066 is coupled to the comparator 1064 for generating the control signal $S_{ctr}$ according to the comparing signal $S_{comp}$. The second signal generator 1066 may be a COT generator.

According to some embodiments, the filtering device 104 comprises an inductor 1042 and a capacitor 1044. The inductor 1042 has a first terminal coupled to the connecting terminal $N_c$. The capacitor 1044 has a first terminal coupled to a second terminal (i.e. the output terminal $N_o$) of the inductor 1042 for outputting the output voltage $V_{o1}$. A resistor 1046 may exist between the capacitor 1044 and the output terminal (i.e. the second terminal $N_o$ of the inductor 1042). The resistor 1046 may be an effective series resistance (ESR) of the capacitor 1044.

Figure 2:
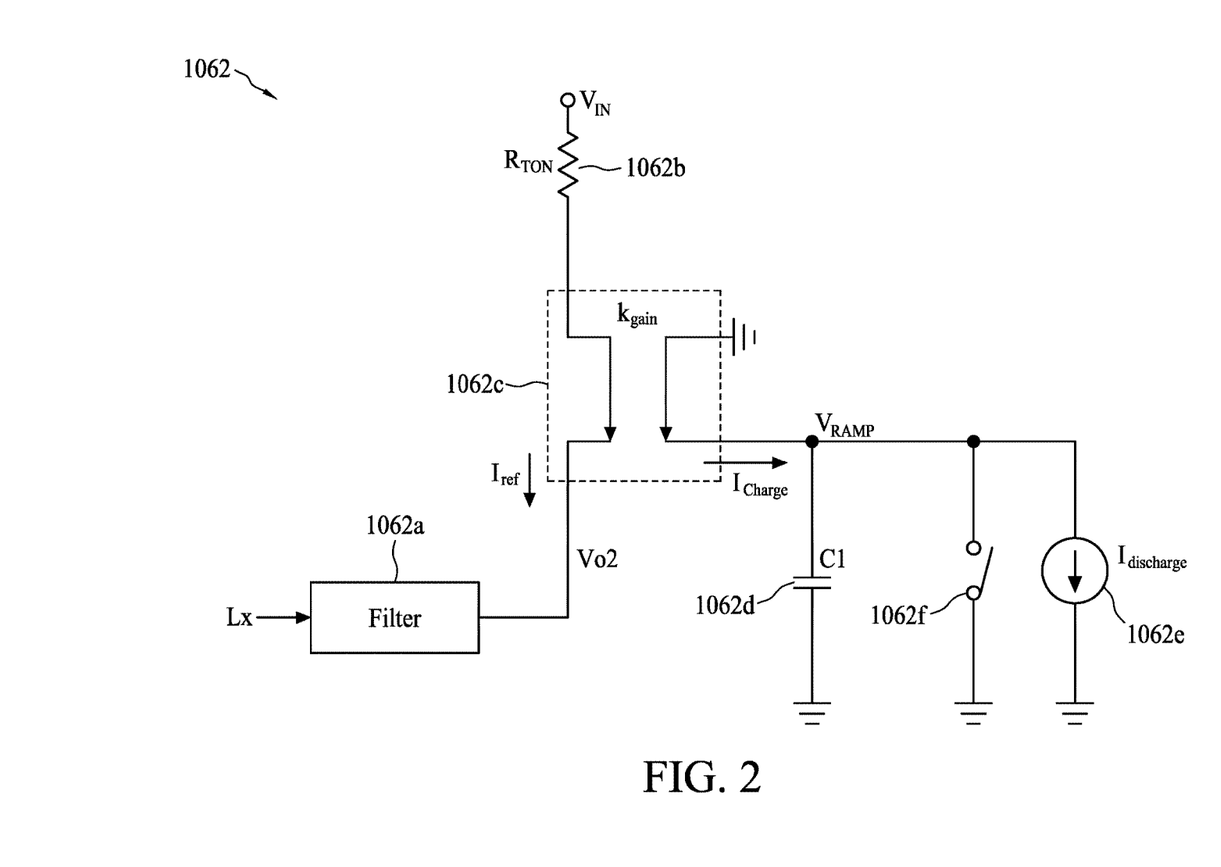
FIG. 2 is a diagram illustrating a first signal generator of FIG. 1 in accordance with some embodiments.

FIG. 2 is a diagram illustrating the first signal generator 1062 in accordance with some embodiments. The first signal generator 1062 comprises a filter 1062a, a resistor 1062b, a current mirror 1062c, a capacitor 1062d, a current source 1062e, and a switch 1062f. The filter 1062a is coupled to the connecting terminal $N_c$ for generating a filtering voltage $V_{o2}$ according to the driving signal $L_x$. The filter 1062a may be a low-pass filter. According to some embodiments, the filter 1062a is similar to or identical with the filtering device 104 in structure, and thus the filtering voltage $V_{o2}$ is similar to the output voltage $V_{o1}$. The resistor 1062b is coupled to the input voltage $V_{IN}$. A reference current $I_{ref}$ is generated according to the filtering voltage $V_{o2}$, the input voltage $V_{IN}$, and the resistor 1062b. The current mirror 1062c has a first input terminal coupled to the resistor 1062b, a second input terminal to receive the filtering signal $V_{o2}$, and an output terminal to provide a charging current $I_{Charge}$ according to a gain $K_{gain}$ of the current mirror 1062C. The capacitor 1062d is coupled to the output terminal of the current mirror 1062c for outputting the first triangle signal $V_{RAMP}$ according to the charging current $I_{Charge}$. The current source 1062e is coupled to the output terminal of the current mirror 1062c for reducing a voltage level of the first triangle signal $V_{RAMP}$. The current source 1062e is arranged to have a discharging current $I_{discharge}$ proportional to the filtering signal $V_{o2}$ or the output voltage $V_{o1}$. In addition, the discharging current $I_{discharge}$ is proportional to the gain $K_{gain}$ of the current mirror 1062c and inversely proportional to the resistance of the resistor 1062b. The switch 1062f is coupled to the output terminal of the current mirror for selectively coupling the voltage level of the first triangle signal $V_{RAMP}$ to a second reference voltage. A control signal of the switch 1062f is omitted here for brevity. The second reference voltage may be the ground voltage GND of the converting apparatus 100.

Figure 3:
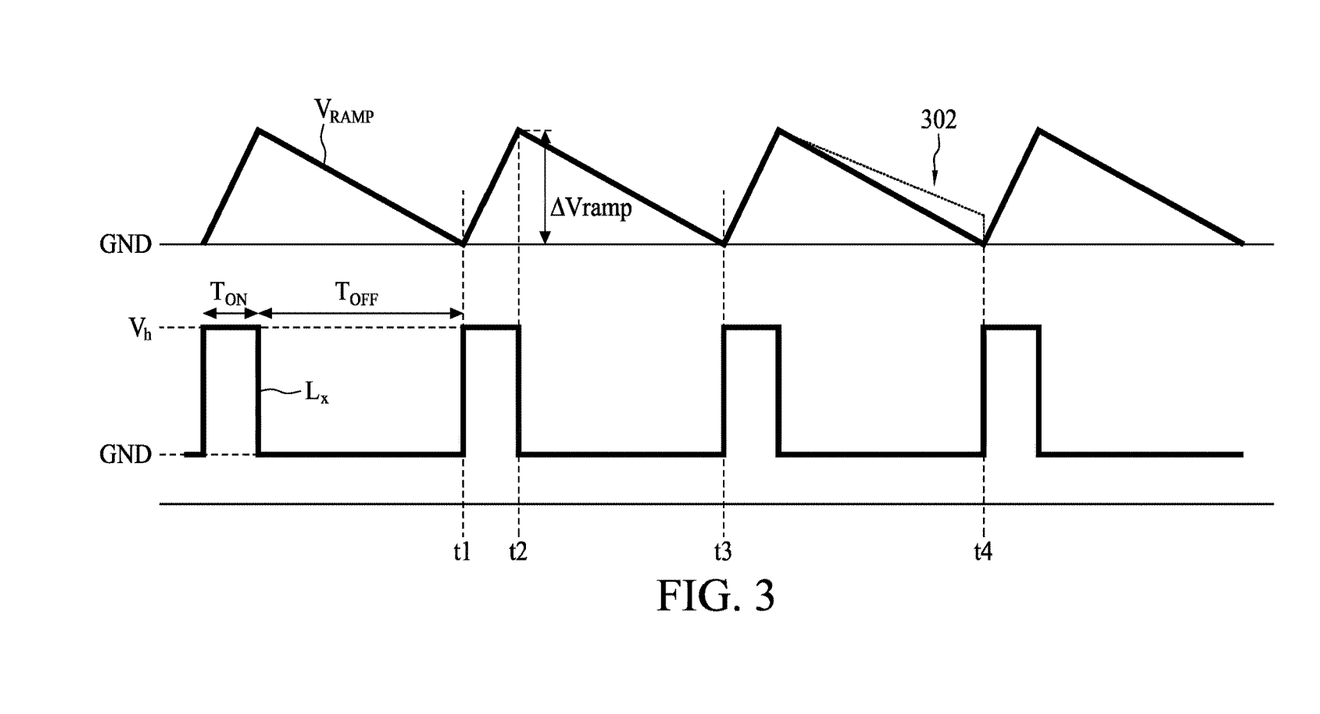
FIG. 3 is a timing diagram illustrating a first triangle signal and a driving signal in accordance with some embodiments.

According to some embodiments, the converting apparatus 100 is arranged to generate a pulse-width modulation signal, i.e. the driving signal $L_x$, at the connecting terminal $N_c$. FIG. 3 is a timing diagram illustrating the first triangle signal $V_{RAMP}$ and the driving signal $L_x$ in accordance with some embodiments. According to some embodiments, during a charging period, the first transistor 1024 is turned on, and the second transistor 1026 is turned off. During a discharging period, the first transistor 1024 is turned off, and the second transistor 1026 is turned on. When the first transistor 1024 is turned on by the first control signal $S_{c1}$, the voltage level at the connecting terminal $N_c$ is charged to a high voltage level $V_h$. The high voltage level $V_h$ may be close to the input voltage $V_{IN}$. When the second transistor 1026 is turned on by the second control signal $S_{c2}$, the voltage level at the connecting terminal $N_c$ is pulled down to reach the ground voltage GND.

When the voltage level of the driving signal $L_x$ is the high voltage level $V_h$, a charging current $I_{Charge}$ is generated to charge the capacitor 1062d such that the voltage level of the first triangle signal $V_{RAMP}$ is a rising ramp during the turn-on period, e.g. the time interval t1~t2 of FIG. 3, which is a constant time, of the first transistor 1024. The charging current $I_{Charge}$ is expressed in the following equation (1):

$$I_{Charge} = \frac{V_{IN} - V_{O2}}{R_{TON}} \times k_{gain} \quad (1)$$

Figure 4:
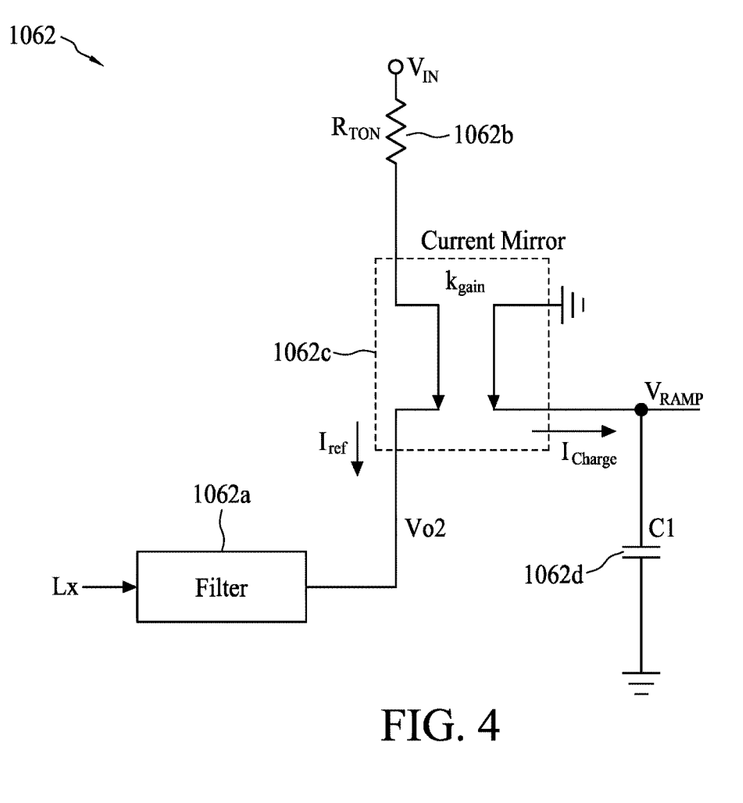
FIG. 4 is a diagram illustrating the first signal generator of FIG. 2 during a turn-on period of a first transistor in accordance with some embodiments.

The parameter $R_{TON}$ is the resistance of the resistor 1062b. FIG. 4 is a diagram illustrating the first signal generator 1062 during the turn-on period $T_{ON}$ of the first transistor 1024 in accordance with some embodiments. The filter 1062a is arranged to perform a low-pass filtering process upon the driving signal $L_x$ to generate the filtering voltage $V_{o2}$. According to some embodiments, the filtering voltage $V_{o2}$ is substantially equal to the output voltage $V_{o1}$. It is noted that, when the charging current $I_{Charge}$ charges the capacitor 1062d, the current source 1062e and the switch 1062f are decoupled/disconnected from the output terminal of the current mirror 1062c. Therefore, the current source 1062e and the switch 1062f are not shown in FIG. 4.

In addition, as a result of operation in the turn-on period $T_{ON}$ of the first transistor 1024, an equation (2) is obtained as illustrated below:

$$I_{Charge} \cdot T_{ON} = \quad (2)$$
$$C_1 \cdot \Delta v => I_{Charge} \cdot (D \cdot T_S) = C_1 \cdot \Delta v => I_{Charge} \cdot \left(\frac{V_{O2}}{V_{IN}} \cdot \frac{1}{F_{SW}}\right) =$$
$$C_1 \cdot \Delta v => \left(\frac{V_{IN} - V_{O2}}{R_{TON}} \times k_{gain}\right) \cdot \left(\frac{V_{O2}}{V_{IN}} \cdot \frac{1}{F_{SW}}\right) = C_1 \cdot \Delta v$$

The parameter $C_1$ is the capacitance of the capacitor 1062d. The parameter $\Delta v$ is the peak-to-peak variation of the first triangle signal $V_{RAMP}$. The parameter D is the duty cycle of the driving signal $L_x$. The parameter $T_s$ is the period of the driving signal $L_x$. The parameter $F_{SW}$ is the frequency of the driving signal $L_x$.

When the voltage level of the driving signal $L_x$ is changed to the ground voltage GND, the discharging current $I_{discharge}$ is arranged to discharge the capacitor 1062d such that the voltage level of the first triangle signal $V_{RAMP}$ is a falling ramp during the turn-off period $T_{OFF}$, e.g. the time interval t2~t3 of FIG. 3, of the first transistor 1024 (or the turn-on period of the second transistor 1026). The discharging current $I_{discharge}$ is expressed in the following equation (3):

$$I_{discharge} = \frac{V_{O2}}{R_{discharge}} \quad (3)$$

Figure 5:
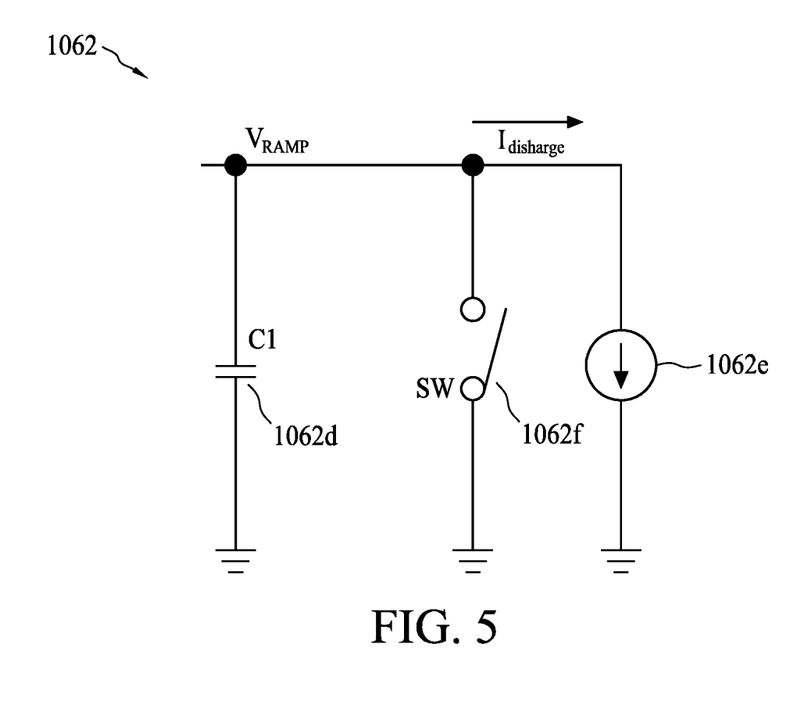
FIG. 5 is a diagram illustrating the first signal generator of FIG. 2 during a turn-off period of a first transistor in accordance with some embodiments.

The parameter $R_{discharge}$ may be regarded as a resistance. FIG. 5 is a diagram illustrating the first signal generator 1062 during the turn-off period $T_{OFF}$ of the first transistor 1024 in accordance with some embodiments. It is noted that, when the discharging current $I_{discharge}$ discharges the capacitor 1062d, the filter 1062a, the resistor 1062b, and the current mirror 1062c are decoupled/disconnected from the output terminal of the capacitor 1062d. Therefore, the filter 1062a, the resistor 1062b, and the current mirror 1062c are not shown in FIG. 5.

As a result of operation in the turn-off period $T_{OFF}$ of the first transistor 1024 (or the turn-on period of the second transistor 1026), an equation (4) is obtained below:

$$I_{discharge} \cdot T_{OFF} = C_1 \cdot \Delta v => I_{discharge} = \quad (4)$$
$$\frac{C_1 \cdot \Delta v}{T_{OFF}} = \frac{C_1 \cdot \Delta v}{(1-D) \cdot T_S} => I_{discharge} = \frac{C_1 \cdot \Delta v}{(1-D) \cdot \frac{1}{F_{SW}}}$$

According to the equations (2), (3), and (4), an equation (5) is obtained below:

$$R_{discharge} = \frac{V_{O2}}{I_{discharge}} => R_{discharge} = \frac{V_{O2}}{\frac{C_1 \cdot \Delta v}{(1-D) \cdot \frac{1}{F_{SW}}}} => R_{discharge} = \quad (5)$$

$$\frac{V_{O2}}{C_1 \times \frac{\left(\frac{V_{IN} - V_{O2}}{R_{TON}} \times k_{gain}\right) \cdot \left(\frac{V_{O2}}{V_{IN}} \cdot \frac{1}{F_{SW}}\right)}{C_1}} \times$$

$$\left(1 - \frac{V_{O2}}{VIN}\right) \cdot \frac{1}{F_{SW}} => R_{discharge} =$$

$$\frac{V_{O2}}{C_1 \times \frac{\left(\frac{V_{IN} - V_{O2}}{R_{TON}} \times k_{gain}\right) \cdot \left(\frac{V_{O2}}{V_{IN}} \cdot \frac{1}{F_{SW}}\right)}{C_1}} \times$$

$$\left(\frac{V_{IN} - V_{O2}}{VIN}\right) \cdot \frac{1}{F_{SW}} => R_{discharge} = \frac{R_{TON}}{k_{gain}}$$

Accordingly, the predetermined resistance $R_{discharge}$ is depended on the resistance $R_{TON}$ of the resistor 1062b and the gain Kgain of the current mirror 1062C. The predetermined resistance $R_{discharge}$ is independent of the input voltage $V_{IN}$, the frequency of the driving signal $L_x$, and the output voltage $V_{o2}$.

Moreover, if the voltage level of the first triangle signal $V_{RAMP}$ does not reach the ground voltage GND before the first transistor 1024 is turned on, the switch 1062f is controlled to turn on for pulling the voltage level of the first triangle signal $V_{RAMP}$ to the ground voltage GND. In other words, the switch 1062f is arranged to force the voltage level of the first triangle signal $V_{RAMP}$ to be the ground voltage GND when the first transistor 1024 is turned on. Accordingly, the voltage level of the first triangle signal $V_{RAMP}$ can start at the ground voltage GND when the first transistor 1024 is turned on. For example, as shown in FIG. 3, if the voltage level (i.e. the dotted line 302) of the first triangle signal $V_{RAMP}$ does not reach the ground voltage GND at time t4, then the switch 1062f is turned on to pull the voltage level of the first triangle signal $V_{RAMP}$ to the ground voltage GND at time t4. Therefore, the control signal (not shown) of the switch 1062f is depended on the voltage level of the first triangle signal $V_{RAMP}$ during the discharging period.

When the first triangle signal $V_{RAMP}$ is generated, the first triangle signal $V_{RAMP}$ is sent to the first adjusting circuit 1068 to generate an offset cancellation voltage (i.e. the offset voltage Vos) based on the feedback voltage FB and the first reference voltage $V_{REF}$. The first adjusting circuit 1068 is arranged to eliminate the ripple offset of the converting apparatus 100. Therefore, the regulation accuracy of the output voltage $V_{o1}$ is improved.

Figure 6:
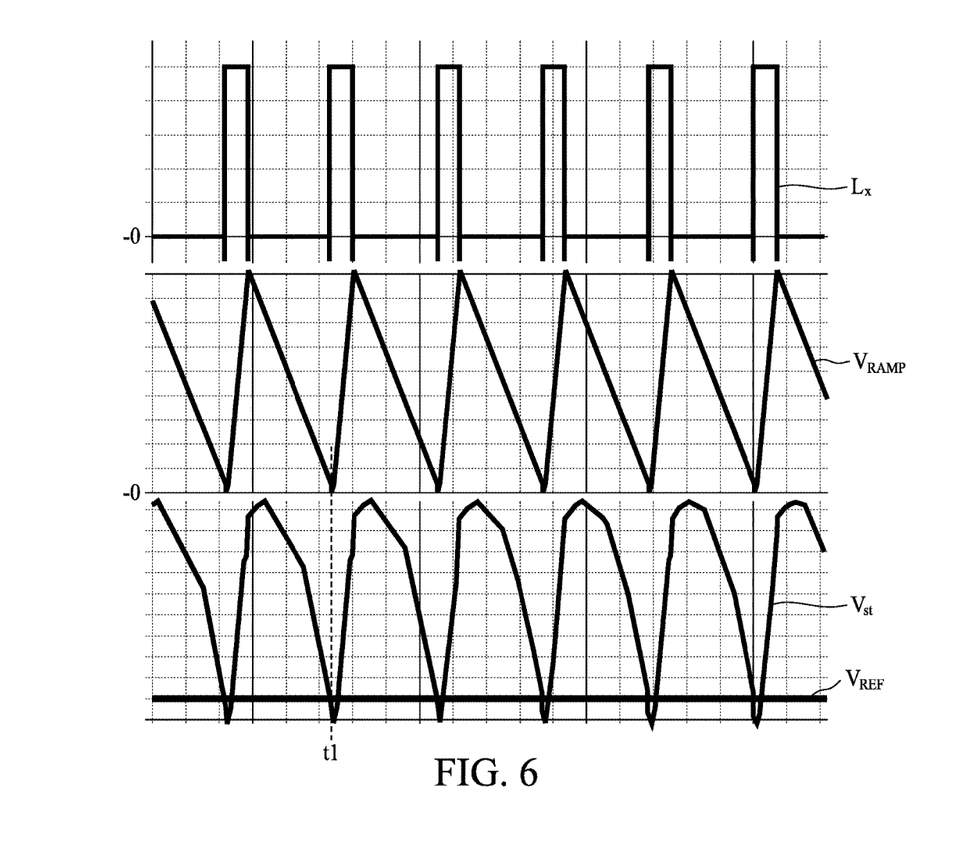
FIG. 6 is a timing diagram illustrating a driving signal, a first triangle signal, a second triangle signal, and a first reference voltage in accordance with some embodiments.

Then, the second adjusting circuit 1070 receives and adds up the feedback voltage FB, the first triangle signal $V_{RAMP}$, and the offset voltage $V_{os}$ to generate the second triangle signal $V_{st}$. FIG. 6 is a timing diagram illustrating the driving signal $L_x$, the first triangle signal $V_{RAMP}$, the second triangle signal $V_{st}$, and the first reference voltage $V_{REF}$ in accordance with some embodiments. It can be seen that the driving signal $L_x$, the first triangle signal $V_{RAMP}$, and the second triangle signal $V_{st}$ are three in-phase signals. For example, when the voltage level of the driving signal $L_x$ is high voltage level, the voltage levels of the first triangle signal $V_{RAMP}$ and the second triangle signal $V_{st}$ are rising. When the voltage level of the driving signal $L_x$ is low voltage level, the voltage levels of the first triangle signal $V_{RAMP}$ and the second triangle signal $V_{st}$ are falling. Accordingly, the feedback loop from the driving signal $L_x$ to the second triangle signal $V_{st}$ is relatively stable.

Please refer to FIGS. 3~6 again, when the voltage level of the second triangle signal $V_{st}$ reaches the first reference voltage $V_{REF}$ at time t1 (for example), the comparator 1064 outputs the comparing signal $Scom_p$ to control the second signal generator 1066 for generating the control signal $S_{ctr}$. Then, the driver 1022 generates the first control signal $S_{c1}$ to turn on the first transistor 1024 and generates the second control signal $S_{c2}$ to the turn off the second transistor 1026 according to the control signal $S_{ctr}$. The voltage level of the driving signal $L_x$ is changed to the input voltage $V_{IN}$ at time t1, and the voltage level of the first triangle signal $V_{RAMP}$ starts increasing as shown in FIG. 3.

Figure 7:
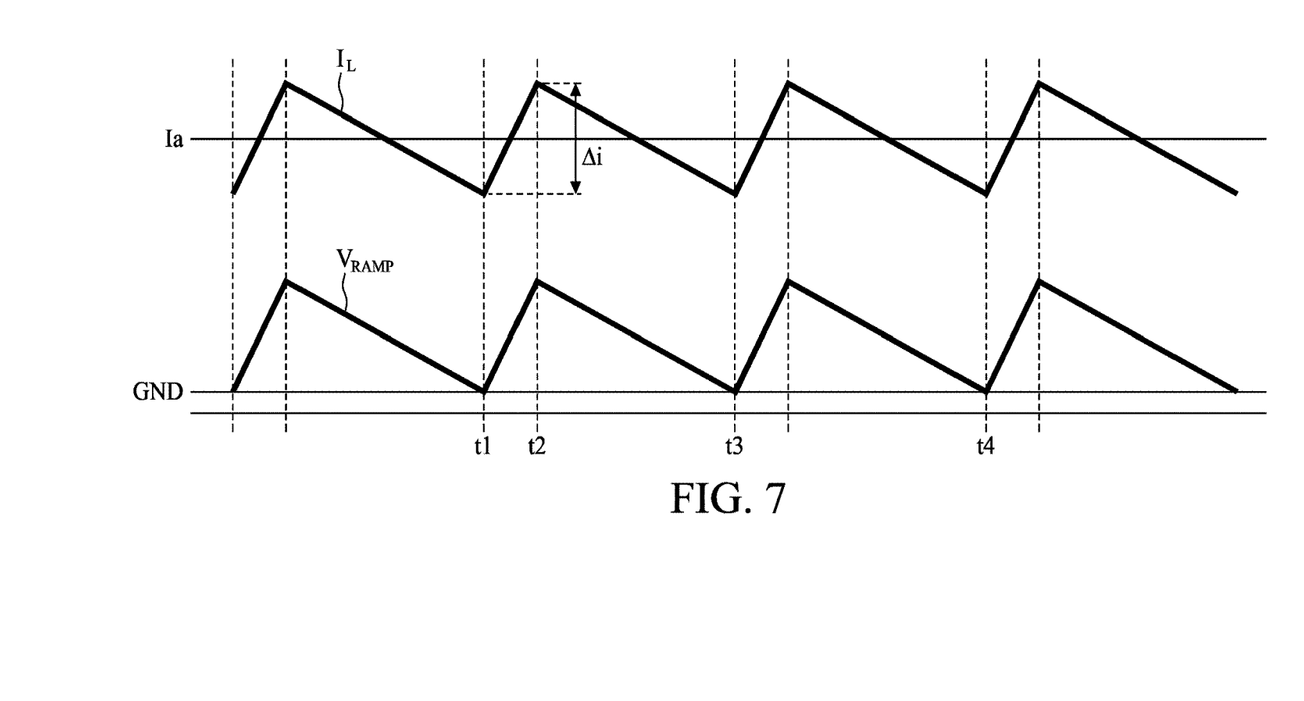
FIG. 7 is a timing diagram illustrating an inductor current and a first triangle signal in accordance with some embodiments.

According to some embodiments, the first triangle signal $V_{RAMP}$ may be regarded as a compensated ramp signal to be injected to the feedback loop (i.e. a portion of circuitry of the controlling device 106) of the converting apparatus 100. The first triangle signal $V_{RAMP}$ is generated by using the input voltage $V_{IN}$ and the driving signal Lx, and not generated by using the loading current $I_L$. However, the variation of the first triangle signal $V_{RAMP}$ may be similar to the variation of the inductor current $I_L$ passing through the inductor 1042, as shown in FIG. 7. FIG. 7 is a timing diagram illustrating the inductor current $I_L$ and the first triangle signal $V_{RAMP}$ in accordance with some embodiments. The inductor current $I_L$ has an average inductor current of $I_a$, and the ripple of the inductor current $I_L$ is Δi. As shown in FIG. 7, the variation of the first triangle signal $V_{RAMP}$ is similar to the ripple of the inductor current $I_L$. In addition, according to some embodiments, the voltage level of the first triangle signal $V_{RAMP}$ always reduces to the ground voltage GND during the discharging period (i.e. $T_{OFF}$), and the voltage level of the first triangle signal $V_{RAMP}$ always starts from the ground voltage GND during the charging period (i.e. $T_{ON}$). Therefore, the complexity of the converting apparatus 100 is reduced because a sample-and-hold circuit may be omitted in the feedback loop. Moreover, since the first triangle signal $V_{RAMP}$ does not have DC component, the slope of the ramp of the first triangle signal $V_{RAMP}$ may be adaptively controlled. It is noted that, in some existing approaches, the inductor current is used as a compensated ramp to be injected to a feedback loop, and a sample-and-hold circuit may be needed to separate the AC (alternating current) and DC components of the inductor current.

Figure 8:
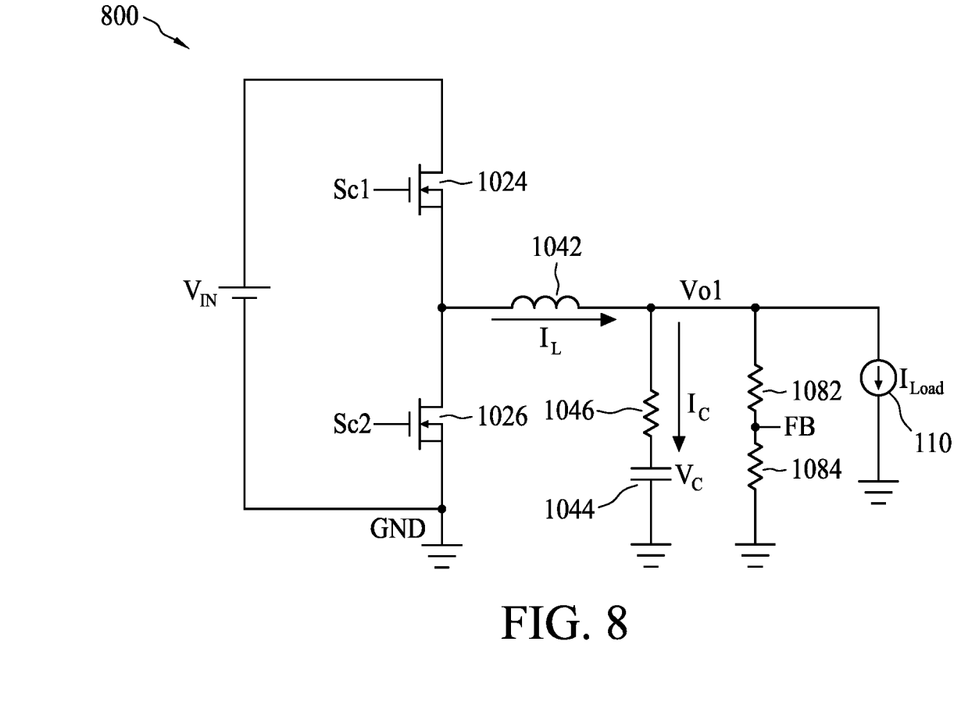
FIG. 8 is a diagram illustrating a converting apparatus in accordance with some embodiments.

FIG. 8 is a diagram illustrating a converting apparatus 800 in accordance with some embodiments. The converting apparatus 800 is a simplified version of the converting apparatus 100, assuming the resistance of the resistor 1046 to be zero or near to zero. As a result, a design criteria (6) for the converting apparatus 100 is obtained below:

$$\frac{\Delta V_{ramp}}{T_{ON}} \geq \frac{dv_c}{dt} \times \frac{R_2}{R_1 + R_2} = > \qquad (6)$$

$$\frac{\Delta V_{ramp}}{T_{ON}} \geq \frac{1}{2} \cdot \Delta I_C \cdot \frac{1}{C} \times \frac{R_2}{R_1 + R_2} = > \frac{\Delta V_{ramp}}{T_{ON}} \geq$$

$$\frac{1}{2} \cdot \Delta I_L \cdot \frac{1}{C} \times \frac{R_2}{R_1 + R_2} = > \Delta V_{ramp} \geq \frac{\Delta I_L \cdot T_{ON}}{2C} \times \frac{R_2}{R_1 + R_2}$$

The parameter $\Delta V_{ramp}$ is the peak-to-peak variation of the first triangle signal $V_{RAMP}$ as shown in FIG. 3. The parameter C is the capacitance of the capacitor 1044. The parameter $dv_c/dt$ is the changing slope of the voltage across the capacitor 1044. The parameter R1 is the resistance of the first resistor 1082. The parameter R2 is the resistance of the second resistor 1084. The parameter $I_L$ is the current flow through the inductor 1042. The parameter $I_C$ is the current flow through the capacitor 1044. According to criteria (6), when the peak-to-peak variation of the first triangle signal $V_{RAMP}$ is equal to or greater than the predetermined value, the converting apparatus 800 may be stable.

Figure 9:
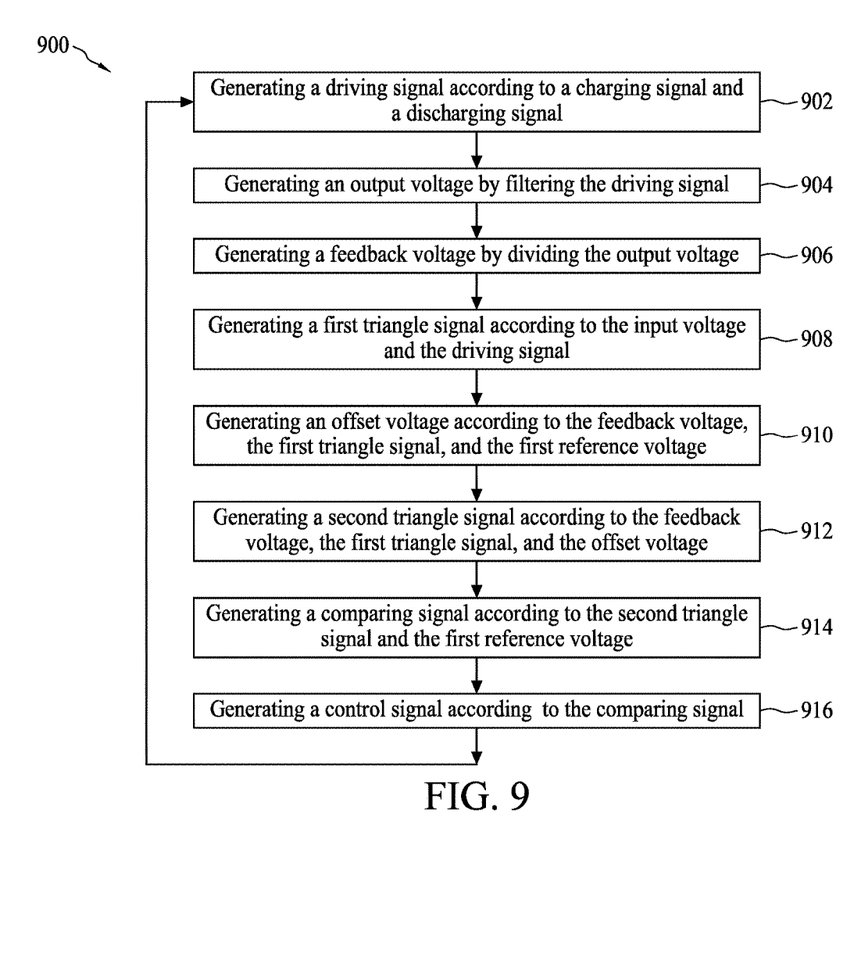
FIG. 9 is a flowchart illustrating a method of generating an output voltage in accordance with some embodiments.

Briefly, the operation of the converting apparatus 100 may be summarized into the operations 902~916 of FIG. 9. FIG. 9 is a flowchart illustrating a method 900 of generating the output voltage $V_{o1}$ in accordance with some embodiments. In operation 902, the driving device 102 is provided to charge the connecting terminal $N_c$ by the charging signal Sc during the charging time and to discharge the connecting terminal $N_c$ by the discharging signal Sdc during the discharging time to generate the driving signal $L_x$.

In operation 904, the driving signal Lx is low-pass filtered by an LC filter to generate the output voltage $V_{o1}$.

In operation 906, the feedback voltage FB is generated by dividing the output voltage $V_{o1}$.

In operation 908, the first triangle signal $V_{RAMP}$ is generated according to the input voltage $V_{IN}$ and the driving signal $L_x$.

In operation 910, the offset voltage Vos is generated according to the feedback voltage FB, the first triangle signal $V_{RAMP}$, and the first reference voltage $V_{REF}$.

In operation 912, the second triangle signal $V_{st}$ is generated by adding up the feedback voltage FB, the first triangle signal $V_{RAMP}$, and the offset voltage Vos.

In operation 914, the comparing signal Scomp is generated to control a COT generator by comparing the second triangle signal $V_{st}$ with the first reference voltage $V_{REF}$.

In operation 916, the control signal $S_{ctr}$ is generated to control the driving device 102 of operation 902 according to the comparing signal $S_{comp}$.

Figure 10:
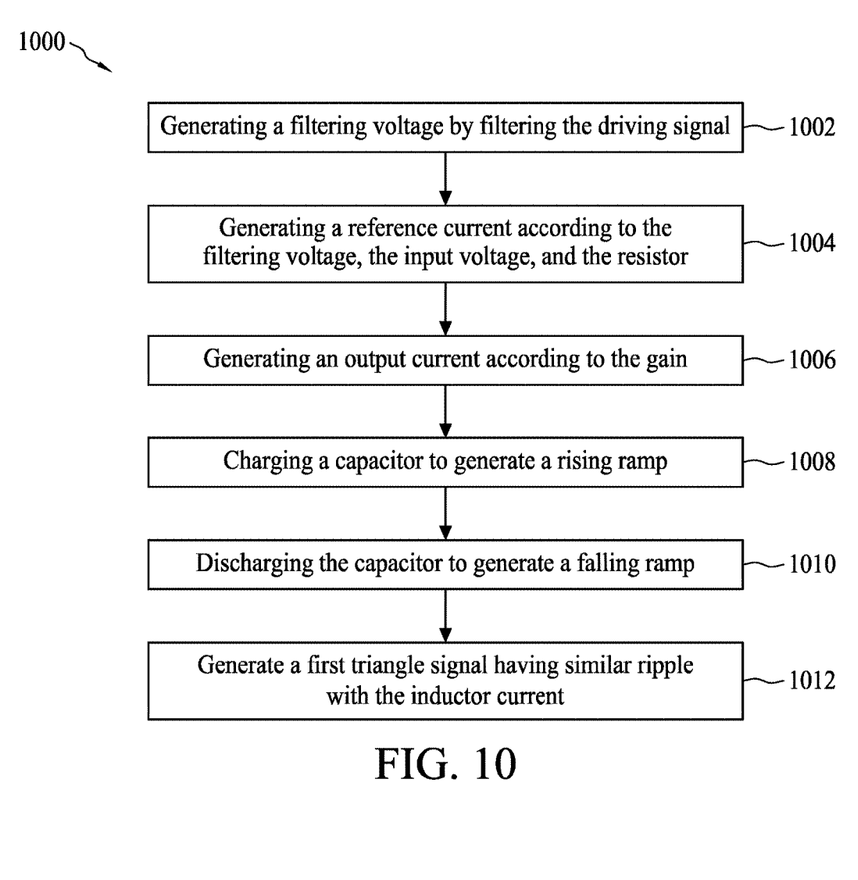
FIG. 10 is a flowchart illustrating a method of generating a ramping signal in accordance with some embodiments.

In addition, the operation of the first signal generator 1062 may be summarized into the operations 1002~1012 of FIG. 10. FIG. 10 is a flowchart illustrating a method 1000 of generating a ramping signal in accordance with some embodiments. The ramping signal may be the first triangle signal $V_{RAMP}$ as shown in FIG. 3, for example. In operation 1002, the filtering voltage $V_{o2}$ is generated by low-pass filtering the driving signal $L_x$.

In operation 1004, the reference current $I_{ref}$ is generated according to the filtering voltage $V_{o2}$, the input voltage $V_{IN}$, and the resistor 1062b.

In operation 1006, the charging current $I_{Charge}$ is generated by mirroring the reference $I_{ref}$ according to the gain $K_{gain}$.

In operation 1008, the charging current $I_{Charge}$ is arranged to charge the capacitor 1062d to generate a rising ramp of the first triangle signal $V_{RAMP}$.

In operation 1010, the discharging current $I_{discharge}$ is arranged to discharge the capacitor 1062d to generate a falling ramp of the first triangle signal $V_{RAMP}$ according to the predetermined resistance $R_{discharge}$ and the filtering voltage Vo2.

In operation 1012, the first triangle signal $V_{RAMP}$ having similar ripple with the inductor current $I_L$ is generated.

Briefly, the present invention provides a ramping signal (e.g. $V_{RAMP}$) having similar ripple with the inductor $I_L$, and the ramping signal does not have DC component. Therefore, a sample-and-hold circuit is omitted. Moreover, when the ramping signal does not have DC component, the slope of the ramping signal may be adaptively controlled.

According to some embodiments, a converting apparatus is provided. The converting apparatus comprises a driving device, a filtering device, and a controlling device. The driving device is arranged to charge a connecting terminal by a charging signal and to discharge the connecting terminal by a discharging signal for generating a driving signal. The filtering device is coupled to the connecting terminal for generating an output voltage according to the driving signal. The controlling device is coupled to the connecting terminal for receiving the driving signal to generate a control signal. The driving device is arranged to generate the charging signal and the discharging signal according to the control signal.

According to some embodiments, a method of generating an output voltage is provided. The method comprises: using a driving device to charge a connecting terminal by a charging signal and to discharge the connecting terminal by a discharging signal for generating a driving signal; filtering the driving signal to generate the output voltage; receiving the driving signal to generate a control signal; and generating the charging signal and the discharging signal according to the control signal.

Those of ordinary skill in the art may recognize that modifications of the embodiments disclosed herein are possible. For example, a total number of the transistors may vary. Other modifications may occur to those of ordinary skill in this art, and all such modifications are deemed to fall within the purview of the present invention, as defined by the claims.

What is claimed is:

1. A converting apparatus, comprising:
a driving device, arranged to facilitate a charging current to a connecting terminal by a charging signal and to facilitate a discharging current from the connecting terminal by a discharging signal, for generating a driving signal;
a filtering device, coupled to the connecting terminal, for generating an output voltage according to the driving signal; and
a controlling device, coupled to the connecting terminal, for receiving the driving signal to generate a control signal;
wherein the driving device is arranged to generate the charging signal and the discharging signal according to the control signal;
wherein the driving device comprises:
a driver, arranged to generate a first control signal and a second control signal according to the control signal;
a first transistor, coupled to the connecting terminal, for generating the charging signal according to the first control signal and an input voltage; and
a second transistor, coupled to the connecting terminal, for generating the discharging signal according to the second control signal;
wherein the controlling device comprises:
a first signal generator, arranged to generate a first triangle signal according to the input voltage and the driving signal;
a comparator, coupled to the first signal generator, for outputting a comparing signal according to the first triangle signal and a first reference voltage; and
a second signal generator, coupled to the comparator, for generating the control signal according to the comparing signal; and
wherein the first signal generator comprises:
a filter, coupled to the connecting terminal for generating a filtering voltage according to the driving signal;
a resistor, coupled to the input voltage;
a current mirror, having a first input terminal coupled to the resistor, a second input terminal to receive the filtering voltage, and an output terminal for generating a charging current according to a gain of the current mirror; and
a capacitor, coupled to the output terminal of the current mirror, for outputting the first triangle signal according to the charging current.

2. The converting apparatus of claim 1, wherein the filtering device comprises:
an inductor, having a first terminal coupled to the connecting terminal; and
a capacitor, having a first terminal coupled to a second terminal of the inductor for outputting the output voltage.

3. The converting apparatus of claim 1, further comprising:
a dividing circuit, coupled to the filtering device, for generating a feedback voltage according to the output voltage;
wherein the controlling device further comprises:
a first adjusting circuit, coupled to the first signal generator and the dividing circuit, for generating an offset voltage according to the feedback voltage, the first triangle signal, and the first reference voltage; and a second adjusting circuit, coupled to the first signal generator and the first adjusting circuit, for generating a second triangle signal according to the feedback voltage, the first triangle signal, and the offset voltage;

wherein the comparator outputs the comparing signal according to the second triangle signal and the first reference voltage.

4. The converting apparatus of claim 1, wherein the current mirror is arranged to increase a voltage level of the first triangle signal.

5. The converting apparatus of claim 1, wherein the first signal generator further comprises:
a current source, coupled to the output terminal, for reducing a voltage level of the first triangle signal.

6. The converting apparatus of claim 5, wherein the current source is arranged to have a current proportional to the output voltage.

7. The converting apparatus of claim 6, wherein the current is inversely proportional to a resistance of the resistor.

8. The converting apparatus of claim 6, wherein the current is proportional to the gain of the current mirror.

9. The converting apparatus of claim 5, wherein the first signal generator further comprises:
a switch, coupled to the output terminal of the current mirror, for selectively coupling the voltage level of the first triangle signal to a second reference voltage.

10. A method of generating an output voltage, the method comprising the steps of:
using a driving device to facilitate a charging current to a connecting terminal by a charging signal and to facilitate a discharging current from the connecting terminal by a discharging signal for generating a driving signal;
filtering the driving signal to generate the output voltage;
receiving the driving signal to generate a control signal; and
generating the charging signal and the discharging signal according to the control signal;
wherein the driving device comprises:
a driver, arranged to generate a first control signal and a second control signal according to the control signal;
a first transistor, coupled to the connecting terminal, for generating the charging signal according to the first control signal and an input voltage; and
a second transistor, coupled to the connecting terminal, for generating the discharging signal according to the second control signal;
wherein a controlling device, coupled to the connecting terminal, for receiving the driving signal to generate the control signal;
wherein the controlling device comprises:
a first signal generator, arranged to generate a first triangle signal according to the input voltage and the driving signal;
a comparator, coupled to the first signal generator, for outputting a comparing signal according to the first triangle signal and a first reference voltage; and
a second signal generator, coupled to the comparator, for generating the control signal according to the comparing signal; and wherein the first signal generator comprises:
a filter, coupled to the connecting terminal for generating a filtering voltage according to the driving signal;
a resistor, coupled to the input voltage;
a current mirror, having a first input terminal coupled to the resistor, a second input terminal to receive the filtering voltage, and an output terminal for generating a charging current according to a gain of the current mirror; and
a capacitor, coupled to the output terminal of the current mirror, for outputting the first triangle signal according to the charging current.

11. The method of claim 10,
wherein the step of receiving the driving signal to generate the control signal comprises:
generating the first triangle signal according to the input voltage and the driving signal;
outputting the comparing signal according to the first triangle signal and the first reference voltage; and
generating the control signal according to the comparing signal.

12. The method of claim 11, further comprising:
dividing the output voltage to generate a feedback voltage;
wherein the step of receiving the driving signal to generate the control signal further comprises:
generating an offset voltage according to the feedback voltage, the first triangle signal, and the first reference voltage; and
generating a second triangle signal according to the feedback voltage, the first triangle signal, and the offset voltage;
wherein the comparing signal is generated by comparing the second triangle signal to the first reference voltage.

13. The method of claim 11, wherein the step of generating the first triangle signal according to the input voltage and the driving signal comprises:
filtering the driving signal on the connecting terminal to generate the filtering voltage;
generating a reference current according to the filtering voltage, the input voltage, and the resistor;
mirroring the reference current to generate the charging current according to the gain; and
outputting the first triangle signal on the capacitor according to the charging current.

14. The method of claim 13, wherein the step of generating the first triangle signal according to the input voltage and the driving signal further comprises:
arranging the charging current to charge the capacitor to increase a voltage level of the first triangle signal.

15. The method of claim 13, wherein the step of generating the first triangle signal according to the input voltage and the driving signal further comprises:
arranging a current source to reduce a voltage level of the first triangle signal.

16. The method of claim 15, wherein a current of the current source is proportional to the output voltage.

17. The method of claim 16, wherein the current is inversely proportional to a resistance of the resistor.

18. The method of claim 16, wherein the current is proportional to the gain.

* * * * *